United States Patent Office 3,524,564
Patented Aug. 18, 1970

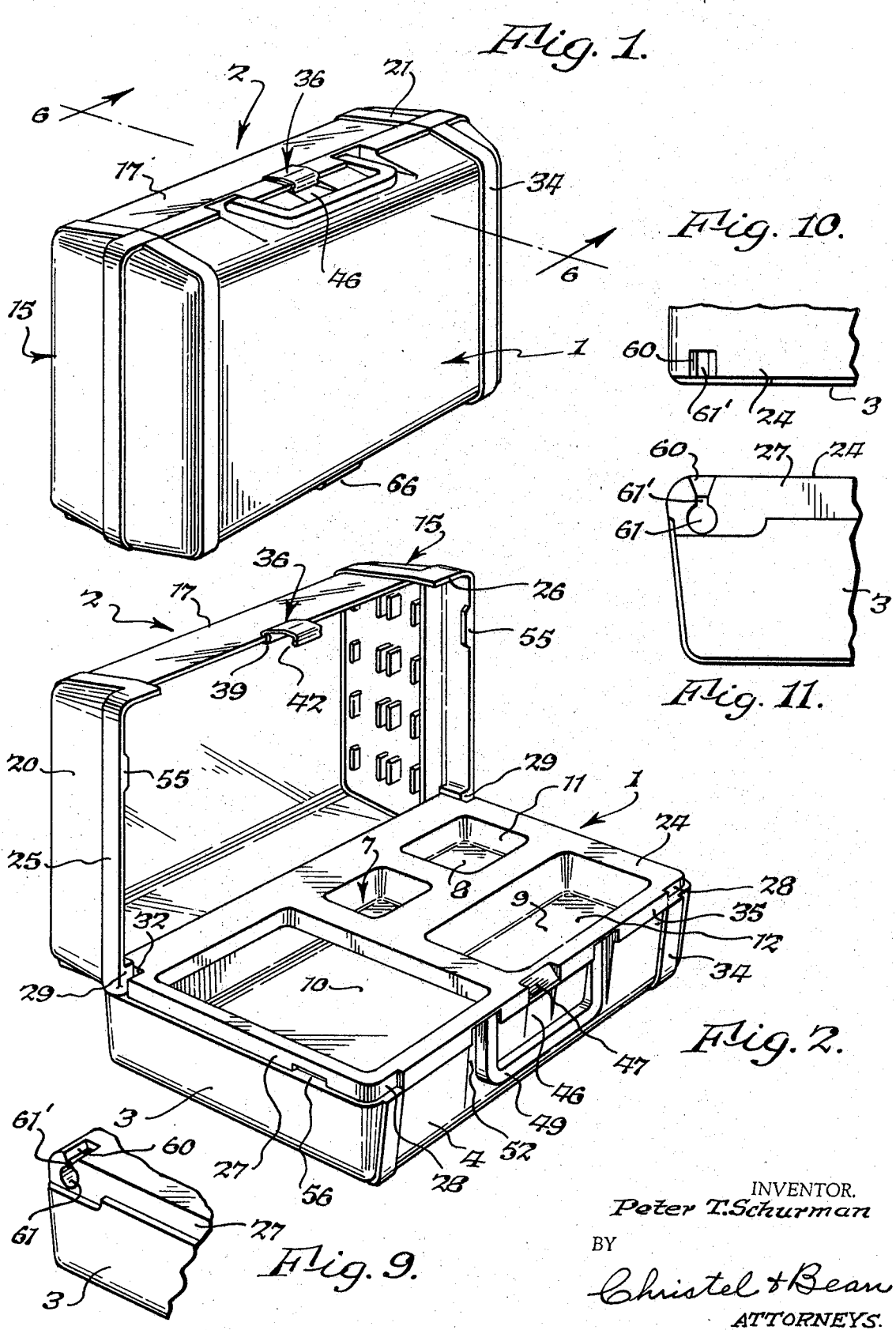

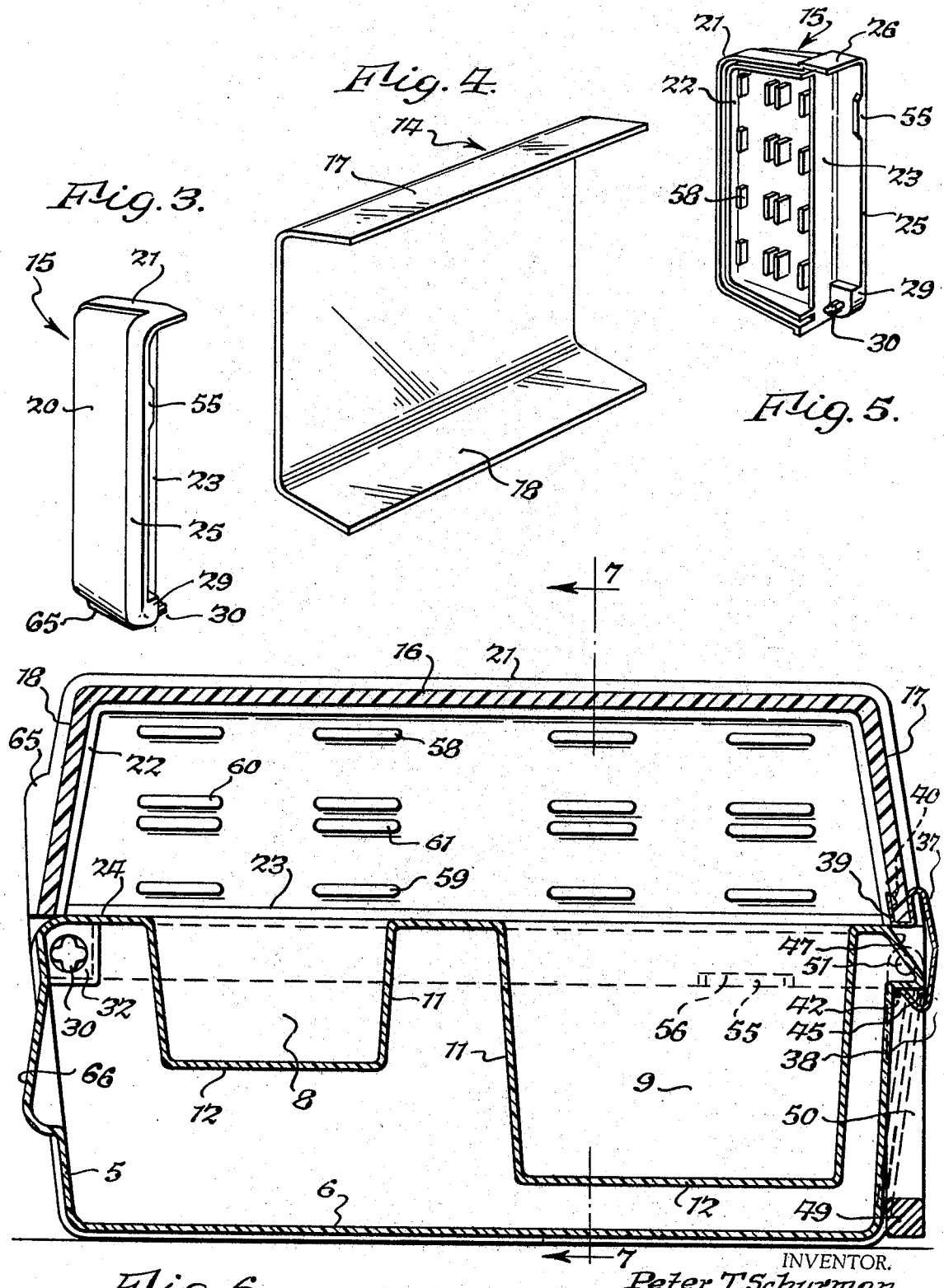

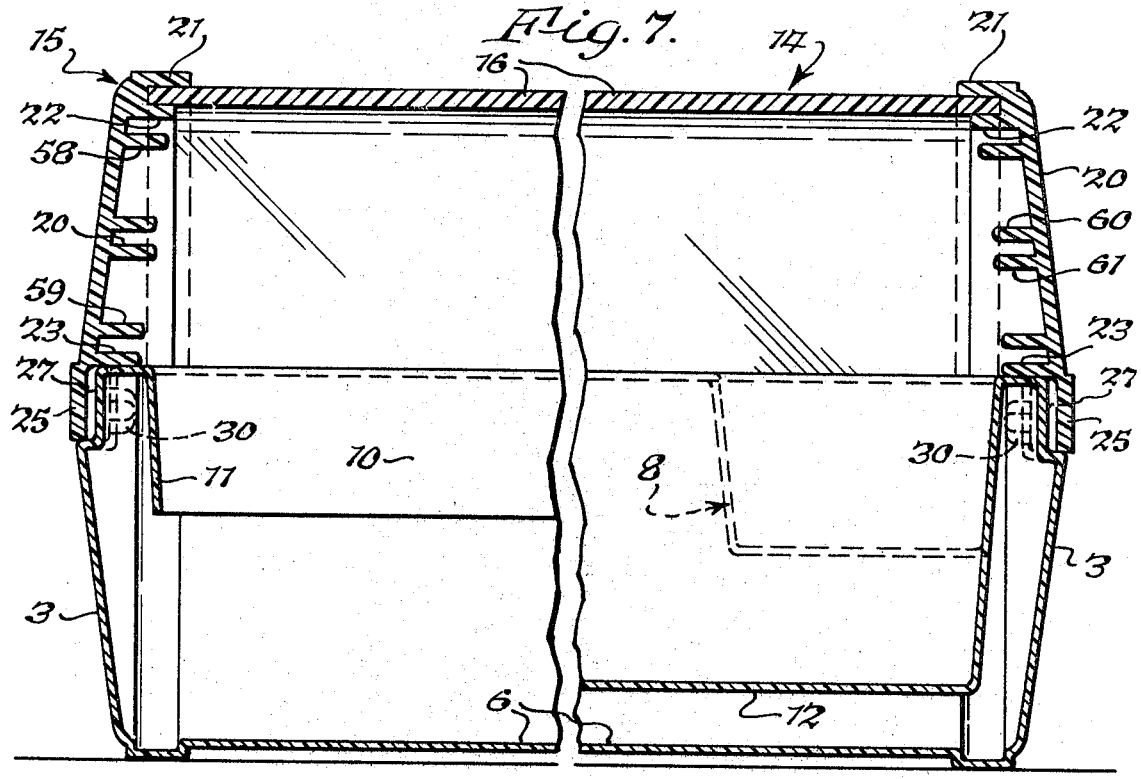
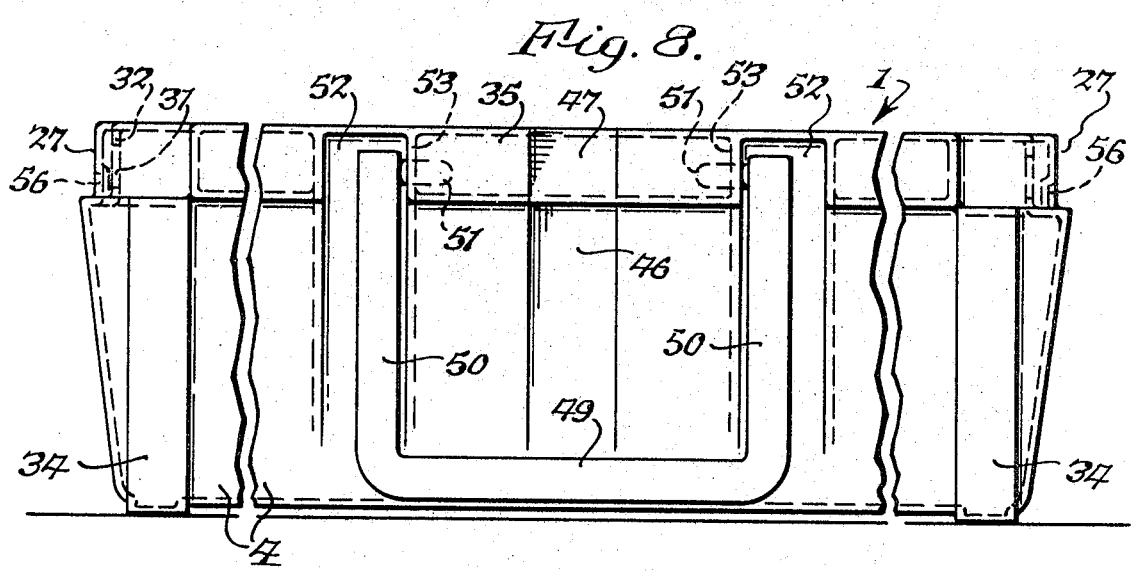

3,524,564
CONTAINER WITH COMPOSITE COVER
Peter T. Schurman, Cassway Road,
Woodbridge, Conn. 06525
Filed July 1, 1968, Ser. No. 741,368
Int. Cl. B65d 25/00
U.S. Cl. 220—16                                    13 Claims

ABSTRACT OF THE DISCLOSURE

A plastic container having a blow-molded body and a composite cover. The cover has a center channel injection molded of a clear plastic material and a pair of injection molded end caps closing the opposite ends of the channel and completing the cover. Hinge pins formed as part of the end caps engage openings in the body, and a latch carried by the channel has locking engagement with the body.

BACKGROUND OF THE INVENTION

This invention relates generally to the container art, and more specifically to a new and useful plastic container having a composite cover construction adapted to be made in part of a transparent material.

The provision of transparency, enabling one to see into or through a closed container, is a highly desirable feature from the merchandising point of view. It permits a prospective purchaser to see what he is buying, without opening the container, and permits the merchant to display the product with the container closed instead of open, thereby conserving display space and the labor cost of preparing and maintaining a display.

Heretofore, the practice has been to provide transparency in plastic containers by injection molding the entire cover and sometimes also the base, of a clear plastic material. While satisfactory for many purposes, this practice poses problems. For example, if expense is a limiting factor, styrene must be used to achieve transparency. However, styrene is brittle and therefore not acceptable as a cover material in many instances. Cellulose acetate is clear, but it also is expensive, only semi-rigid and embrittles on aging making it generally unsuited for container covers made in this manner. Other clear plastic materials are available but, like acetate, are relatively expensive compared to styrene.

Also, where it is desired to provide a line of containers in a variety of sizes, the tooling for such injection molded covers is prohibitively costly.

SUMMARY OF THE INVENTION

A primary object of this invention is to provide a plastic container having a transparent cover which can be formed inexpensively and without the objectionable brittleness previously noted.

Another object of this invention is to provide the foregoing in a cover construction permitting a variety of surface and interior treatments.

It is also an object of this invention to provide a container construction combining blow molding and injection molding in a manner utilizing the former to provide a compartmented, cushioned base and the latter to provide transparency in the cover.

A characterizing feature of this invention lies in the utilization of a composite cover construction. In a presently preferred form, the cover comprises a center channel which can be extruded but which preferably is injection molded of clear plastic material, and a pair of end cap members which also are injection molded and which need not be clear and therefore can be formed of other plastic materials having greater impact strength than the material of the center channel.

The foregoing and other objects, advantages and characterizing features of this invention will become apparent from the ensuing detailed description of a presently preferred embodiment thereof, reference being made to the accompanying drawings depicting the same.

BRIEF DESCRIPTION OF THE DRAWING FIGURES

FIG. 1 is a perspective view of a container incorporating the instant invention, shown in closed position;
FIG. 2 is a perspective view thereof in open position;
FIG. 3 is a perspective view showing the outer side of an end cap component of the container cover;
FIG. 4 is a perspective view of the center channel component of the cover;
FIG. 5 is a perspective view showing the inner side of the end cap component;
FIG. 6 is a sectional view of the closed container taken about on line 6—6 of FIG. 1;
FIG. 7 is a sectional view thereof taken about on line 7—7 of FIG. 6, broken away for convenience in illustration;
FIG. 8 is a side elevational view of the container body, without the cover, broken away for convenience in illustration;
FIG. 9 is a fragmentary perspective view thereof showing a modified hinge construction;
FIG. 10 is a fragmentary top plan showing the container body portion of the hinge of FIG. 9; and
FIG. 11 is a fragmentary side elevational view thereof.

DESCRIPTION OF THE ILLUSTRATED EMBODIMENT

The illustrative container depicted in the accompanying drawings comprises a base or body part generally designated 1 and a cover part generally designated 2. Body 1 is a hollow, double wall construction formed by an outer shell having end walls 3, front wall 4, rear wall 5 and bottom wall 6, and an inner shell extending across the outer shell and formed to provide compartments 7, 8, 9 and 10. These various compartments are defined by side walls 11 of different depths, and compartments 7, 8, and 9 are closed by bottom walls 12. As will be understood by those versed in the blow molding art, compartment 10 also was formed with a bottom wall, but the same has been cut away to provide access to the interior of body 1 between the inner and outer shells for storage or any other purpose.

Body art 1 can be conveniently blow molded of polyethylene, polypropylene, polyvinyl or any other suitable thermoplastic material, using known blow molding techniques, and can be formed to provide compartments of any desired configuration in the inner shell. Being molded as a separate unit, the body 1 can be formed relatively inexpensively and can be made to provide a wide variety of compartment shapes and sizes. In addition to such compartmenting of the body, the utilization of a blow-molded construction cushions the contents of the compartments because of the double wall construction that is provided.

The cover part 2 includes a center channel member 14 and a pair of end cap members 15. Channel member 14 can be extruded, but preferably is injection molded of a clear plastic material, such as styrene, to provide a top wall 16 and front and rear walls 17 and 18, respectively, as shown. Channel member 14 extends between the opposite ends of the container, as defined by body 1 terminating short of those ends.

Channel member 14 is closed at its opposite ends, and the cover part 2 is completed by the end cap members 15 which are injection molded to provide a side wall portion 20 extending across the corresponding end of base 3 and around the front and rear thereof, as clearly shown in FIGS. 2 and 3. An outwardly offset flange 21 extends across the top and downwardly along the opposite sides of the wall portion 20, and together with an inner flange 22 defines a peripheral groove receiving the adjacent end of the center channel 14, as most clearly shown in FIG. 7. Flanges 21 and 22, and the channel receiving groove defined thereby are of generally inverted U-shape in the closed position of cover 2 shown in FIG. 6.

A horizontal flange 23 extends across each end cap 15 on the inner side thereof, from front to rear between the opposite ends of flange 22 as shown in FIGS. 5 and 6. Flange 23 overlies and seats upon a ledge 24 formed as part of the inner shell of body 1 and extending around compartments 7–10 adjacent the juncture of the inner and outer shells.

Each end cap 15 also can be formed with an outwardly offset flange 25 extending along the bottom of side wall portion 20 below flange 23. Flange 25 extends across the end of cover 2 and around the front thereof as shown at 26 to provide a peripheral skirt, and end walls 3 and front wall 4 of body 1 are inwardly offset adjacent their upper ends as shown at 27 and 28 to receive end cap flanges 25, 26 in overlapping relation. End caps 15 are so designed that the lower edge of skirt flange 25, 26 just clears the step provided by the body wall offsets 27, 28 when flanges 23 are seated on ledge 24. Inwardly directed detents 55 formed on flanges 25 snap lightly over ledge 24 and into recesses 56 formed in body wall offsets 27 to help hold cover 2 and body 1 against relative twisting. Each end cap 15 is formed to provide an inwardly extending enlargement 29 at the rear of flange 25 and body walls 3 and 5 are inwardly offset to receive the same as clearly shown in FIG. 2. An inwardly directed hinge pin 30 is formed as an integral extension of each enlargement 29, and hinge pins 30 are received in openings 31 which extend through the inwardly offset wall faces 32. While hinge pins of cruciform shape are shown in the drawings, it will be appreciated that pins 30 can have other cross-sectional configurations. Also, while a hinged cover customarily will be provided, hinge pins 30 can be omitted if a simple lift-off type of cover is desired.

An alternate, presently preferred hinge construction is shown in FIGS. 9-11. Instead of forming body 1 to provide inwardly offset, hinge receiving corners, as before, each of the offset end wall portions 27 is molded with a V-slot 60 therein opening upwardly through ledge 24 adjacent the rear corner. A hinge pin receiving opening 61 is molded or drilled in the body at each rear corner, opening into the adjacent slot 60 through a restricted slot or passage 61', which is cut between hole 61 and slot 60.

Enlargements 29 are omitted in the hinge of FIG. 9, and hinge pins 30 extend inwardly from flanges 25. To assemble the cover on the body the hinge pins 30 first are positioned in slots 60 and then passed downwardly through passages 61' into openings 61. The walls of passages 61' resiliently yield, permitting pins 30 to snap into position in openings 61. While hinge pins 30 can be cylindrical, they also can be especially shaped to enhance such snapfit assembly. The upper rear edges of the body are rounded as required to accommodate movement of the cover about its hinge axis. In both forms of hinge, opening movement of the cover is limited by engagement of channel 14 and/or end caps 15 with body 1.

The outer shell of body 1 can be formed to provide outwardly offset bands 34 extending across bottom wall 6 and upwardly along front and rear walls 4 and 5, in alinement with flanges 21. In addition to the ornamental effect thereby produced, bands 24 raise bottom wall 6 above the supporting surface on which the container is placed, as clearly shown in FIGS. 7 and 8.

The outer shell of body 1 also can be formed to provide an outwardly offset band 35 extending across the upper end of front wall 4 between the inwardly offset portions 28 and in line with flanges 25, 26 when cover 2 is closed. In addition to the ornamental effect thereby produced, band 35 facilitates the provision of handle attaching and latch engaging arrangements, described as follows:

Flange 25 and 26, or either of them, can be omitted, with flanges 25 being omitted from the hinge portion forwardly. In that case, body 1 can be formed without the inwardly offset portions 27, 28, and band 35 can be extended around the ends.

While a variety of latching devices could be used, the illustrated latch, generally designated 36, has been selected because of its simplicity and low cost coupled with its effectiveness and attractive appearance. As clearly shown in FIG. 6, latch 36 comprises a piece of spring steel or other suitable material formed to provide reversely sloping frontal surfaces 37 and 38. At the outer end of surface 37 the latch material is folded over and terminates in an outwardly facing channel 39 receiving and gripping the outer edge portion of cover channel wall 17. Prongs 40 struck from the end wall of channel 39 bite into the material of cover wall 17, although other and additional means can be used to secure latch 36 to wall 17 of cover channel 14.

At the outer end of surface 38, the latch material is reverse bent to extend inwardly and upwardly as viewed in FIG. 6, terminating in a rounded edge 42 adapted to engage beneath a shoulder 45 extending inwardly from the lower edge of band 35. Shoulder 45 is formed in the front wall 4 of the outer body shell by forming a centrally located, inwardly offset portion 46 therein immediately below band 35. An inclined lead surface 47 is formed in body 1 from ledge 24 to just above shoulder 45 to cam latch edge 42 outwardly over band 35 upon closing movement of cover 2 relative to body 1. Latch edge 42 snaps beneath shoulder 45 to lock cover 2 in closed position. When it is desired to swing cover 2 to a container open position, latch edge 42 is manually displaced outwardly from beneath shoulder 45 by resiliently deflecting the latch and the front wall 17 of channel 14.

A generally U-shaped handle is provided, having a hand grip bight portion 49 and opposite side legs 50 each terminating at its outer end in an inwardly directed hinge pin 51. The handle can be injection molded of suitable plastic material. Front wall 4 is formed to provide a pair of inwardly offset portions 52 arranged to receive legs 50 and to accommodate spreading thereof when assembling the handle to body 1. Hinge pin receiving openings are provided in the laterally outwardly facing wall surfaces 53 provided by offset portions 52. The handle 49, 50, 51 can be injection molded of suitable plastic material, and is nicely accommodated in front wall 4. Assembly of the handle to body 1 is accomplished by spreading apart legs 50, which resiliently yield, and releasing them when hinge pins 51 are alined with their respective openings. The illustrated arrangement has the further advantage that legs 50 resist spreading upon stressing the handle, as when carrying a relatively heavily loaded container, thereby maintaining the hinged connection between the handle and body 1.

To facilitate standing the container in the position shown in FIG. 1, a foot 65 is formed at the rear of each end cap 15. A similar foot 66 is formed in rear wall 5 of body 1, midway between its ends, the feet 65, 66 providing three-point support for the closed container.

While center channel 14 of cover 2 need not be transparent, and need not be made of plastic material, it is a particular feature of my invention that it provides for a see-through cover by making channel 14 of clear plastic material. At the same time, the composite cover construction enables end caps 15 to be made of a different material. As a result, the material of channel 14 can be selected on the basis of cost and clarity. Even though the material selected on this basis, for example styrene, may be brittle, that is not the problem it would be in a one-piece molded cover because end caps 15 can be formed of a stronger, less brittle material such as impact styrene.

End caps 15 close and cover the opposite ends of channel 14, with flanges 21 encircling the same in outwardly offset relation thereto as clearly shown in FIG. 6, whereby end caps 15 protect the more brittle channel 14. End caps 15 are more apt to be hit than channel 14 because of the location and arrangement of end caps 15 relative to channel 14. At the same time, end caps 15 and channel 14 cooperate in providing a relatively strong cover structure.

Where end caps 15 are made of an opaque material that does not detract from the transparency provided by center channel 14 which comprises the major portion of cover 2 and which provides transparency from above as well as from front and rear. Indeed, end caps 15 delineate and enhance the window effect of channel 14, and the composite structure of cover 2 permits decorative effects and design treatments not possible with a one-piece molded cover.

Center channel 14 can be extruded or otherwise formed. However, for maximum clarity free of blushing it is presently contemplated that channel 14 will be injection molded.

In addition to styrene, other plastic materials such as XT polymer, acetate, polycarbonate, polyvinyl chloride and acrylic can be used in forming channel 14. Any of these materials also can be used in forming end caps 15. Of course, it will be be appreciated that my ivention is not limited to the use of these particular materials which are listed by way of example.

Channel 14 is joined to end caps 15 as by cementing, welding, ultrasonic sealing, or other suitable means, to comprise a composite cover or lid of substantial structural integrity. In the embodiment of FIGS. 1–8, cover 2 and body 1 resiliently yield to permit assembly in hinged relation; in the embodiment of FIGS. 9–11 they snap fit together. The provision of a separate cover subsequently joined to the body means that body 1 can be packed and shrink-wrapped prior to asembly of cover 2 thereon.

It is another feature of my invention that end caps 15 can be formed with means for receiving display or other informative material. For example, the inner face of wall portion 20 can be formed with a row of spaced ribs 58 in spaced relation to flange 22 across the top of the end cap, thereby defining with flange 22 a groove for receiving a display card or the like and retaining the same in closely spaced relation to the center or top wall portion 16 of center channel 14. This is particularly useful when it is desired to provide a display visible through the transparent top wall of the cover.

Similarly, a row of spaced ribs 59 can be provided in closely spaced relation to flange 23, to define therewith a groove for receiving and retaining a display card. Intermediate rows of spaced-apart ribs 60, 61 also can be provided, defining therebetween a groove for receiving and retaining a card or the like. It is not intended that a particular end cap will need each or any of the ribs 58, 59, 60 and 61. These are shown in the drawings merely to illustrate what can be accomplished with the molded end caps 15 and composite cover of my invention.

A channel shaped card, not shown, of cardboard or other material shaped to fit within channel 14 can be provided, and can be printed on opposite sides and even die cut for spot transparency.

Also, instead of the elongated rib construction shown in the drawings, other rib shapes, as well as bosses and sockets can be molded on the inner wall surfaces of end caps 15, for retaining or accommodating members other than display cards and the like. For example, a cantilevered tray might be provided, having a hinge connection in bosses molded on the inner surface of end caps 15.

While walls 16, 17 and 18 are shown as being flat, they could be curved, and if desired could comprise arcs of a common circle in cross section and still provide a center member 14 of inverted generally channel shape as that term is used herein.

Accordingly, it is seen that my invention fully accomplishes its intended objects. The advantages associated with a blow-molded body are provided, in combination with a cover providing transparency in an arrangement permitting use of relatively inexpensive materials. The illustrated arrangements and foregoing detailed description are given by way of example, not by way of limitation.

What I claim is:

1. A container comprising a body of thermoplastic material, and a composite cover including a center channel member preformed to an inverted generally channel shape and extending lengthwise of said cover, the opposite ends of said center member terminating short of the opposite ends of said cover, and a pair of end cap members closing said opposite ends of said center member, said end cap members being of thermoplastic material and each of said end cap members having a peripheral groove opening inwardly lengthwise of the cover and corresponding shapewise to the cross-sectional configuration of said center channel member and receiving the adjacent end thereof, said center channel member being joined to said end cap members to comprise a composite cover of substantial structural integrity in which said end cap members are joined to each other only by said center channel member.

2. A container as set forth in claim 1, wherein said end cap members project beyond said center member across the top, front and rear thereof adjacent said opposite ends.

3. A container as set forth in claim 1, wherein said center member comprises a one-piece construction of substantially transparent thermoplastic material throughout.

4. A container as set forth in claim 3, wherein said end cap members are formed with display card receiving ribs interiorly of said cover.

5. A container as set forth in claim 1, wherein each of said end cap members is formed to provide a hinge pin integral therewith and extending inwardly lengthwise of said cover, said body having hinge pin receiving means.

6. A container as set forth in claim 5, wherein said body comprises a one-piece member of double wall construction formed to provide a shoulder in an outer wall thereof, and a latch carried by said center cover member for engagement with said shoulder.

7. A container as set forth in claim 1, wherein said body comprises a one-piece, box-like member of double wall construction.

8. A container as set forth in claim 7, wherein the inner wall of said body is formed to provide compartments.

9. A container as set forth in claim 7, wherein said body comprises inner and outer walls joined by a generally horizontal ledge extending around the top of said body, said end cap members seating on said ledge at the opposite ends of said body when said cover is closed.

10. A container as set forth in claim 9, wherein each of said cap members includes a side wall portion extending across the corresponding end of said body, and a flange extending across said side wall portion on the inner side thereof, said flanges seating on said ledge when said cover is closed.

11. A container as set forth in claim 10, wherein each of said end cap members also includes a peripheral skirt, said skirts extending below said flanges in overlapping relation to the outer wall of said body when said cover is closed.

12. A container comprising a body of thermoplastic material, and a composite cover including a center member of inverted generally channel shape extending lengthwise of said cover, the opposite ends of said center member terminating short of the opposite ends of said cover, and a pair of end cap members closing said opposite ends of said center member, said end cap members being of thermoplastic material and being joined to said center member to provide a cover for said body, wherein each of said end cap members is formed to provide a hinge pin integral therewith and extending inwardly lengthwise of said cover, said body having hinge pin receiving means, and wherein said body comprises a one-piece member of double wall construction providing a ledge around said body, said hinge pin receiving means comprising openings through the outer wall of said body and lead-in slots through said ledge to said openings.

13. A container as set forth in claim 12, wherein said hinge pins pass through said slots with a snap fit.

References Cited

UNITED STATES PATENTS

| | | | |
|---|---|---|---|
| 2,123,023 | 7/1938 | Pilliod et al. | |
| 2,333,410 | 11/1943 | Busch | 206—45.34 X |
| 2,375,645 | 5/1945 | Gordon | 220—31 X |
| 2,859,893 | 11/1958 | Reed | 206—45.34 X |
| 2,990,082 | 6/1961 | Boysen | 220—31 |
| 3,315,718 | 4/1967 | Berman | 220—16 X |
| 3,339,781 | 9/1967 | Schurman et al. | 220—9 |
| 3,360,116 | 12/1967 | Sommers et al. | 220—31 X |
| 3,391,765 | 7/1968 | Baker | 220—31 X |

JOSEPH R. LECLAIR, Primary Examiner

J. R. GARRETT, Assistant Examiner

U.S. Cl. X.R.

206—45.34; 220—31, 55, 82